US009178806B2

(12) United States Patent
Varvello et al.

(10) Patent No.: US 9,178,806 B2
(45) Date of Patent: Nov. 3, 2015

(54) HIGH-SPEED CONTENT ROUTING

(75) Inventors: Matteo Varvello, Port Monmouth, NJ (US); Diego Perino, Issy-les-Moulineaux (FR); Jairo O Esteban, Freehold, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 311 days.

(21) Appl. No.: 13/563,381

(22) Filed: Jul. 31, 2012

(65) Prior Publication Data

US 2014/0036918 A1  Feb. 6, 2014

(51) Int. Cl.
*H04L 12/725* (2013.01)
*H04L 12/64* (2006.01)
*H04L 12/933* (2013.01)
*H04L 12/741* (2013.01)
*H04L 12/773* (2013.01)

(52) U.S. Cl.
CPC .......... *H04L 45/306* (2013.01); *H04L 12/6402* (2013.01); *H04L 45/745* (2013.01); *H04L 49/15* (2013.01); *H04L 45/54* (2013.01); *H04L 45/60* (2013.01)

(58) Field of Classification Search
CPC ... H04L 49/106; H04L 49/15; H04L 12/6402; H04L 49/9068
USPC ........................... 370/221, 353, 359, 364, 389
See application file for complete search history.

(56) References Cited

U.S. PATENT DOCUMENTS

| 6,760,327 B1 * | 7/2004 | Manchester et al. .......... 370/364 |
| 7,110,394 B1 * | 9/2006 | Chamdani et al. ............ 370/355 |
| 2005/0094634 A1 | 5/2005 | Santhanakrishnan et al. |
| 2009/0003327 A1 * | 1/2009 | Zang et al. .................... 370/359 |
| 2010/0215047 A1 | 8/2010 | Filsfils et al. |

FOREIGN PATENT DOCUMENTS

EP  2375659 A1  10/2011

OTHER PUBLICATIONS

International Search Report dated Jan. 15, 2014 for PCTUS2013/052474.
Invitation to Pay Additional Fees for PCT/US2013/052474; dated Nov. 12, 2013.

* cited by examiner

*Primary Examiner* — Raj Jain
(74) *Attorney, Agent, or Firm* — Kramer & Amado, P.C.

(57) ABSTRACT

Various exemplary embodiments relate to a method and related network node including one or more of the following: receiving, at a first input line card of the network device, a message, the message including a destination address; transmitting the message, by the first input line card, to the second input line card based on the determination that the second input line card is configured with routing information related to the destination address; determining, by the second input line card and based on the routing information related to the destination address, that the message should be forwarded via a first output line card of the network device to another network device; transmitting the message, by the second input line card, to the first output line card based on the determination that the message should be forwarded; and transmitting the message, by the first output line card, to another network device.

17 Claims, 6 Drawing Sheets

700

| | Content Name | Output Card |
|---|---|---|
| 730 | /JDOE/PAPERS/PaperA.pdf | 2 |
| 740 | /JDOE/notes.txt | 1 |
| 750 | ... | ... |

| | Bucket | Content Prefix | Output Card |
|---|---|---|---|
| 840 | 1 | h(/JDOE) | 1 |
| 850 | 2 | h(/TUX) | 1 |
| | | h(/JDOE/VIDEOS) | 2 |
| 860 | 3 | H(/JDOE/VIDEOS/JD2012) | 1 |
| 870 | ... | ... | ... |
| 880 | p | H(/JDOE/PAPERS) | 2 |

*FIG. 8*

HIGH-SPEED CONTENT ROUTING

TECHNICAL FIELD

Various exemplary embodiments disclosed herein relate generally to computer networking.

BACKGROUND

The Internet has evolved from a medium to interconnect machines into a medium to connect machines with content such as videos and photos. While the Internet developed on top of various mechanics, such as routing information via IP address, future architectures may employ alternative mechanisms in view of the current state of the Internet. One common principle among many proposals is that these future architectures may be centered on the content provided, rather than the machines themselves.

Content-centric networking is a more recent paradigm where content is requested by name, rather than location. This paradigm may employ name-based routing, wherein a router may move traffic to a destination server based on the "content name." As such, Internet routers may be provided with explicit information as to the content being moved.

One result of name-based routing is that, while IP addresses are constrained in the number of variations and are clustered geographically, content names may take on virtually any value and may point to a server located anywhere, regardless of the locations of servers hosting content with similar names. As such, the number of entries in a name-based routing table may be orders of magnitude larger than an IPv4 or IPv6 routing table. This presents new challenges in efficiently storing the table and quickly forwarding traffic using the table.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for forwarding a message, the method including: receiving, at a first input line card of the network device, a message to be forwarded toward a destination, the message including a destination address; determining, by the first input line card, that a second input line card of the network device is configured with routing information related to the destination address; transmitting the message, by the first input line card, to the second input line card based on the determination that the second input line card is configured with routing information related to the destination address; determining, by the second input line card and based on the routing information related to the destination address, that the message should be forwarded via a first output line card of the network device to another network device; transmitting the message, by the second input line card, to the first output line card based on the determination that the message should be forwarded via a first output line card of the network device to another network device; and transmitting the message, by the first output line card, to another network device.

Various embodiments are described wherein the first output line card includes one of the first input line card and the second input line card.

Various embodiments are described wherein the destination address is a content name.

Various embodiments are described wherein the transmitting the message to the second line includes transmitting the message, by the first input line card, to an input port of the second input line card.

Various embodiments are described wherein determining, by the first input line card, that the second input line card of the network device is configured with routing information related to the destination address includes: performing a hash function on at least a portion of the destination address to generate a hashed destination address; and determining that an assigned identifier of the second input line card corresponds to the hashed destination address.

Various embodiments are described wherein the first input line card stores a first set of forwarding information, the second input line card stores a second set of forwarding information that is different from the first set of forwarding information.

Various exemplary embodiments relate to a network device for forwarding a message, the network device including: a routing information base (RIB) storage configured to store routing information; a plurality of line cards; and a processor configured to: generate a line card table that associates a first identifier with a first input line card of the plurality of line cards and associates a second identifier with a second input line card of the plurality of line cards; generate a first set of forwarding information based on the routing information and the first identifier; generate a second set of forwarding information that is different from the first set of forwarding information based on the routing information and the second identifier; provide the line card table and the first set of forwarding information to the first input line card; and provide the line card table and the second set of forwarding information to the second input line card.

Various embodiments are described wherein, in generating the first set of forwarding information based on the routing information and the first identifier, the processor is configured to: generate an address prefix and associated forwarding information based on the routing information; perform a mathematical operation with respect to address prefix to generate a value; determine that the value matches the first identifier; and include the address prefix in the first set of forwarding information based on the value matching the first identifier.

Various embodiments are described wherein the processor is further configured to: receive an indication that the second input line card has failed; generate an updated line card table that associates the first identifier with the first input line card and associates the second identifier with a first output line card of the plurality of line cards; generate a third set of forwarding information based on the routing information and the second identifier; and provide the updated line card table and the third set of forwarding information to the first output line card.

Various embodiments are described wherein the first input line card includes: a first memory configured to store the line card table; and a first processing manager configured to: receive a message to be forwarded toward a destination device, the message including a destination address; determine, based on the second identifier and the destination address, that the second input line card should process the message; and transmit the message to the second input line card, based on determining that the second input line card should process the message.

Various embodiments are described wherein the second input line card includes: a second processing manager configured to determine that the second input line card should process the message; and a forwarding module configured to: determine that a first output line card should forward the message to another network device, and transmit the message to the first output line card.

Various embodiments are described wherein the second input line card further includes a memory configured to store a cache table; and the forwarding module is a cache configured to, in determining that the first output line card should forward the message to the other network device: determine that the cache table stores an entry associated with the destination address, and determine that the entry identifies the first output line card.

Various embodiments are described wherein the second input line card further includes a hash table storage configured to store the second set of forwarding information; and the forwarding module is a longest prefix matching (LPM) block configured to, in determining that the first output line card should forward the message to the other network device: identify an entry of the second set of forwarding information having a longest matching prefix for the destination address; and determine that the entry identifies the first output line card.

Various embodiments are described wherein, in identifying the entry of the second set of forwarding information having the longest matching prefix for the destination address, the LPM block utilizes a set of distributed Bloom filters to determine the length of the longest matching prefix.

Various exemplary embodiments relate to a network device for forwarding a message, the network device including: a first input line card that stores a first set of forwarding information; and a second input line card that stores a second set of forwarding information different from the first set of forwarding information, wherein the first input line card is configured to: receive a message to be forwarded, and transfer the message to the second input line card, and wherein the second input line card is configured to forward the message based on the second set of forwarding information.

Various embodiments are described wherein the first set of forwarding information and the second set of forwarding information store forwarding information for content address prefixes.

Various embodiments are described wherein the network device includes a switching fabric and, in forwarding the message based on the second set of forwarding information, the second input line card is configured to transmit the message via the switching fabric.

Various embodiments are described wherein the first input line card is configured to determine that a destination address associated with the message is assigned to the second input line card.

Various embodiments are described wherein, in determining that the destination address associated with the message is assigned to the second input line card, the first input line card is configured to: generate a hash value based on at least a portion of the destination address; generate an index based on the hash value and a number of line cards configured for the network device; and determine that the index corresponds to the second input line card.

Various embodiments are described wherein the second set of forwarding information includes forwarding information for a plurality of address prefixes of differing lengths and, in forwarding the message based on the second set of forwarding information, the second input line card is configured to: extract a destination address of the message; apply a set of distributed Bloom filters to the destination address to determine a beginning prefix length; and begin searching the second set of forwarding information by evaluating forwarding information for at least address prefix having the beginning prefix length.

BRIEF DESCRIPTION OF THE DRAWINGS

In order to better understand various exemplary embodiments, reference is made to the accompanying drawings, wherein:

FIG. 7 illustrates an exemplary data arrangement for storing cache data;

FIG. 8 illustrates an exemplary data arrangement for storing forwarding information;

To facilitate understanding, identical reference numerals have been used to designate elements having substantially the same or similar structure or substantially the same or similar function.

DETAILED DESCRIPTION

Figure 1:
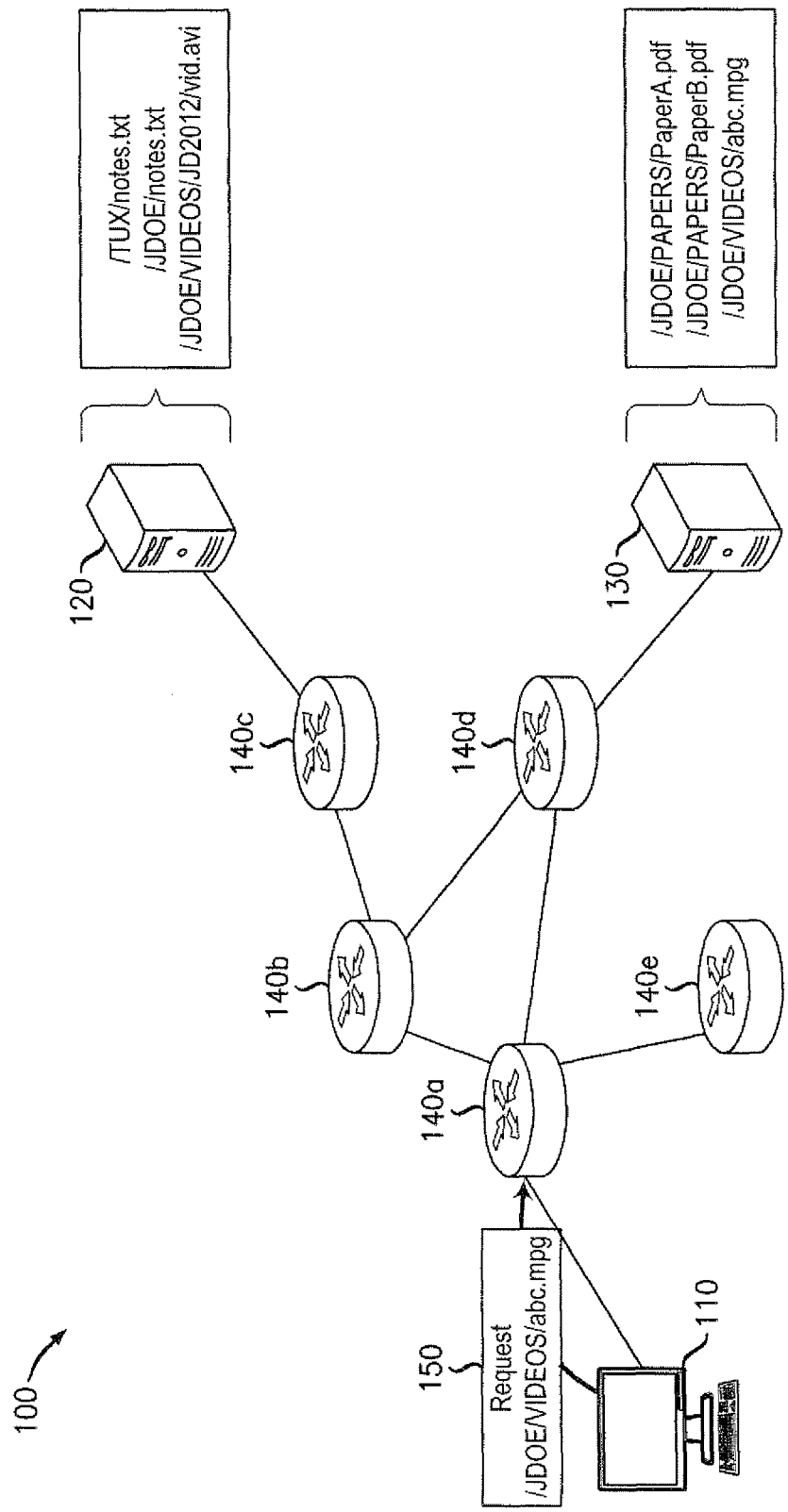
FIG. 1 illustrates an exemplary network for routing messages.

As described above, various emerging routing paradigms propose to expand the routing table used in routing traffic over the Internet and other networks. While larger tables may be accommodated by larger and faster memories and faster processors, this approach may be cost-prohibitive. Accordingly, it may be desirable to implement a method of route resolution that may distribute a routing table and/or various routing operations among multiple hardware entities. Various additional objects and benefits will be apparent in view of the following description. It will be apparent to those of skill in the art that, while various examples described herein are described with respect to name-based routing, the methods and systems described may be useful in other environments such as, for example, routing according to IPv4 or IPv6 protocols.

Referring now to the drawings, in which like numerals refer to like components or steps, there are disclosed broad aspects of various exemplary embodiments.

FIG. 1 illustrates an exemplary network 100 for routing messages. In various embodiments, the exemplary network 100 may be the Internet or a portion thereof. It will be apparent to those of skill in the art that the exemplary network 100 may constitute, in some respects, a simplification. For example, the exemplary network 100 may include numerous additional clients, servers, routers, switches, and/or other network devices. As illustrated, the exemplary network 100 may include a number of network devices: a client device 110, two servers 120, 130, and five routers 140a-e. As used herein, the term "router" may be understood to refer to any network device capable of receiving data messages and forwarding data messages toward their ultimate destination. Thus, the term "router" may encompass network devices operating at any layer of the OSI model of networks such as, for example, a switch (Layer 2) or a true router (Layer 3). Further, the term "message" will be understood to encompass any chunk of data transferred from one device to another such as, for example, a frame or a packet.

As shown, the routers 140a-e may interconnect the client device 110, the server 120, and the server 130, such that messages may be exchanged between these devices. As noted, the exemplary network 100 may constitute a simplification and, as such, there may be a number of intermediate routers and/or other network devices (not shown) providing communication between those network devices that are illustrated. For example, the router 140c may be connected to the server 120 through one or more intermediate network devices (not shown).

The client device 110 may be any device capable of requesting and receiving content via a network. For example, the client device 110 may include a personal computer, laptop, mobile phone, tablet, or other device. The servers 120, 130 may each be any device capable of receiving requests and serving content. For example, the servers 120, 130 may each include a personal computer, stand-alone server, blade server, or other device. The servers 120, 130 may each host a number of content items, each item being identified by at least one content name. As illustrated, for example, the server 120 may host three content items identified as "TUX/notes.txt," "JDOE/notes.txt," and "/JDOE/VIDEOS/JD2012/vid.avi." As another example, the server 130 may also host three content items identified as "/JDOE/PAPERS/PaperA.pdf," "/JDOE/PAPERS/PaperB.pdf," and "/JDOE/VIDEOS/abc-.mpg." The client device 110 may request the delivery of any of these items by sending a request message, which may then be routed by the routers 140a-e to the appropriate server 120, 130. This routing may be performed based on the name of the content requested. Thus, the content name may be referred to as a destination address of the request message. The server 120, 130 may then use the request to locate the appropriate content and transmit the content back to the client device 110 via the routers 150a-e.

As an example, FIG. 1 illustrates the client device 110 transmitting a request message 150 to the router 140a. The request message 150 may include a destination address of "/JDOE/VIDEOS/abc.mpg." Thus, the message 150 may request content stored by the server 130. Upon receiving the request message 150, the router 140a may then perform various routing operations to determine to which router, or "next hop," the request message 150 should be forwarded in order to advance the request message 150 toward its ultimate destination. To provide this capability, the routers 140a-e may each include a routing table for the network 100. Alternatively, the routers 140a-e may together implement a distributed routing table. As such, each router 140a-e may include a portion of, but not the entire, routing table associated with this set of routers 140a-e. For example, each router 140a-e may be assigned a range of addresses assigned for which that router 140a-e may store the available routing records. In various alternative embodiments, the network 100 may include one or more network devices that are not routers and that contain a portion of the distributed routing table. For example, the network 100 may include a dedicated server (not shown) that stores a portion of the distributed routing table and assists the routers 140a-e in forwarding messages in a manner similar to how the routers 140a-e may provide assistance to other routers 140a-e in forwarding messages. Further details regarding distribution of a routing table among multiple network devices are described in co-pending application Ser. No. 13/421,389, filed Mar. 15, 2012, the entirety of which is incorporated for all purposes herein by reference.

In various alternative embodiments, the request message 150 may address a specific "chunk" of the content requested. For example, the request message 150 may request "/JDOE/VIDEOS/abc.mpg/chunk2." In various embodiments wherein all chunks for a particular content item are stored at the same location, the destination address used in processing the message may omit the chunk identifier, thus routing based on "/JDOE/VIDEOS/abc.mpg." In various alternative embodiments such as, for example, embodiments where content may be distributed among multiple servers, routers may route based on the chunk identifier as well, thus routing based on "/JDOE/VIDEOS/abc.mpg/chunk2" in this example.

Figures 2, 3:
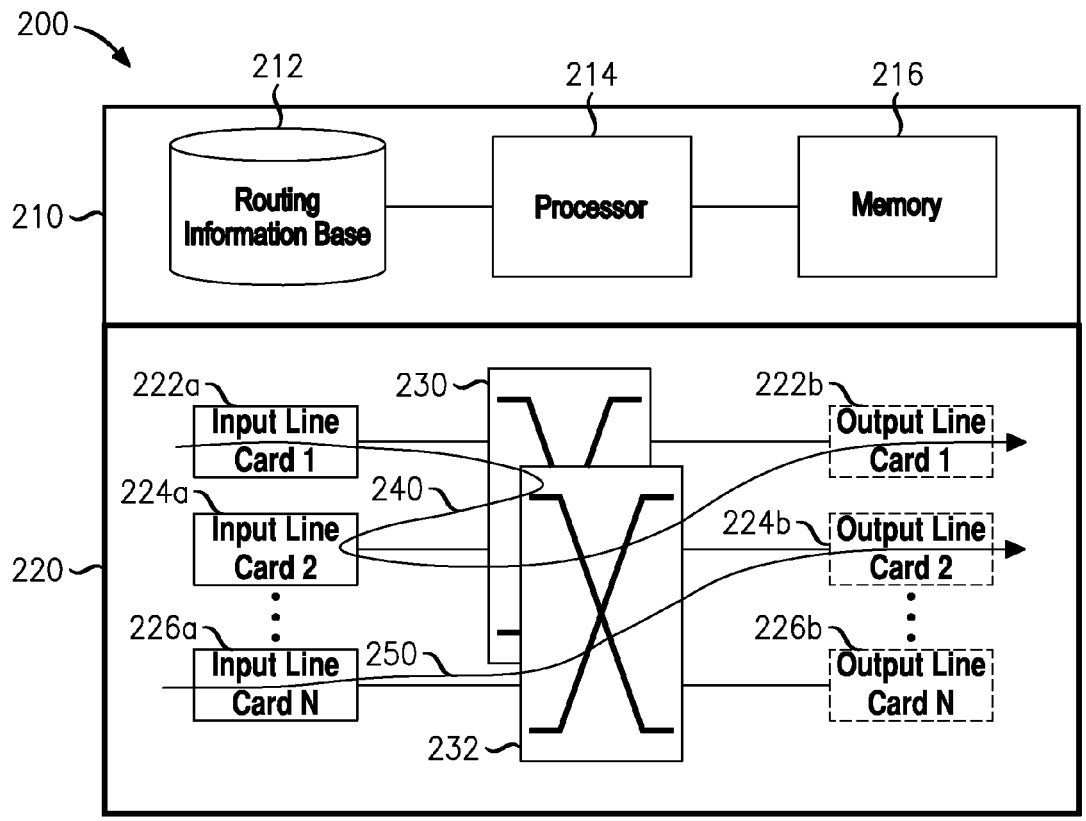
FIG. 2 illustrates an exemplary network device for routing messages.
FIG. 3 illustrates an exemplary data arrangement for storing routing information.

FIG. 2 illustrates an exemplary network device 200 for routing messages. The network device 200 may correspond to one or more of the routers 140a-e of the exemplary network 100. As such, the network device 200 may be configured to route messages based on a destination address, such as a content name. As illustrated, exemplary network device may include a control plane 210 and a data plane 220. Control plane 210 may include a routing information base (RIB) storage 212, a processor 214, and a memory 216. Data plane may include a plurality of line cards 222a-b, 224a-b, 226a-b and a plurality of switching fabrics 230, 232.

The RIB storage 212 may be a device configured to store routing information, such as a RIB. The RIB storage 212 may include a machine-readable storage medium such as read-only memory (ROM), random-access memory (RAM), magnetic disk storage media, optical storage media, flash-memory devices, and/or similar storage media. For example, the RIB storage 212 may include an SRAM that stores information regarding which destination addresses may be reached through various next hop devices. Exemplary contents of the RIB storage 212 will be described in greater detail below with respect to FIG. 3.

The processor 214 may be a processing device such as a microprocessor, field programmable gate array (FPGA), application specific integrated circuit (ASIC), or other device. The processor 214 may be configured to perform various control plane functions. The memory 216 may include any memory device capable of supporting processor 214. For example, the memory 216 may include one or more SRAM chips.

In various embodiments, the processor 214 may be configured to generate one or more sets of forwarding information based on the contents of the RIB storage 212 and provide the one or more sets of forwarding information, such as forwarding information bases (FIBs) to the line cards 222a-b, 224a-b, 226a-b. This generation may include selection of optimal routes for each known address prefix and correlation of net hop devices to appropriate output ports or line cards.

In various embodiments, the processor 214 may be configured to provide different sets of forwarding information to each of the line cards 222a-b, 224a-b, 226a-b. As will be described in greater detail below with respect to FIG. 4, the processor 214 may provide each line card 222a-b, 224a-b, 226a-b with a subset of the total forwarding information. The processor 214 may also provide each line card 222a-b, 224a-b, 226a-b with a line card table useful in determining which line card 222a-b, 224a-b, 226a-b has been given the forwarding information useful to process a message having a given destination address.

The line cards 222*a-b*, 224*a-b*, 226*a-b* may each constitute a device capable of receiving and forwarding messages having one or more input ports and one or more output ports. Each line card 222*a-b*, 224*a-b*, 226*a-b* may be useful as an input line card 222*a*, 224*a*, 226*a*, and an output line card 222*b*, 224*b*, 226*b*. The input line cards 222*a*, 224*a*, 226*a* may each be configured to receive messages, either from another external device or the switching fabrics 230, 232, and subsequently send the message to an appropriate output line card 222*b*, 224*b*, 226*b* via the switching fabrics 230, 232. The output line cards 222*b*, 224*b*, 226*b*, may be configured to receive messages from the switching fabrics 230, 232 and output the message to a next hop network device. Thus, as used herein, the terms "input line card" and "output line card" may refer to the same type of physical device performing input and output functions, respectively. Further, a "line card" may constitute both an "input line card" and an "output line card." The data plane 220 may include numerous additional line cards (not shown). In various embodiments, the data plane 220 may include five hundred or one thousand line cards (not shown).

The switching fabrics 230, 232 may include hardware or machine-executable instructions encoded on a machine-readable medium configured to transport messages between the line cards 222*b*, 224*b*, 226*b*. It will be understood that the data plane 220 may include fewer or additional switching fabrics (not shown). In various embodiments, the data plane 220 may include eight or sixteen switching fabrics (not shown).

As will be explained in greater detail below with respect to FIGS. 5-10, the input line cards 222*a*, 224*a*, 226*a* may select an appropriate output line card 222*b*, 224*b*, 226*b* based on a local forwarding information base (FIB). Upon receiving a message, an input line card 222*a*, 224*a*, 226*a* may first consult a local line card table to determine whether the local FIB is likely to include the forwarding information useful in forwarding the message. If not, the input line card 222*a*, 224*a*, 226*a* may forward the message to another input line card 222*a*, 224*a*, 226*a* that does have access to this forwarding information. For example, as shown by message path 240, input line card 1 222*a* may receive a message and determine that input line card 2 224*a* may store the forwarding information useful in forwarding the message. Thereafter, input line card 1 222*a* may forward the message to input line card 2 224*a* via one of the switching fabrics 230, 232. Next, line card 2 224*a* may use the locally stored forwarding information to determine that output line card 1 22*b* should forward the message to the next hop. This may be the case, for example, where each line card 222*a-b*, 224*a-b*, 226*a-b*, includes multiple ports connected to different devices. Input line card 2 may then pass the message to output line card 1 222*b* which may then forward the message to another network device.

In some cases, a line card 222*a-b*, 224*a-b*, 226*a-b* may receive a message for which the line card 222*a-b*, 224*a-b*, 226*a-b* stores the useful forwarding information. For example, in message flow 250, line card N 226*a* may receive a message from an external device and determine, based on the locally-stored forwarding information, that line card 2 224*b* should forward the message to the next hop. Input line card N 226*a* may then forward the message directly to output line card 2 224*b* which may, in turn, forward the message to the next hop device.

FIG. 3 illustrates an exemplary data arrangement 300 for storing routing information. The data arrangement 300 may be implemented using a variety of data structures such as, for example, objects, arrays, linked lists, trees, and/or hash tables. The data arrangement 300 may be stored in, for example, the RIB storage 212 of the exemplary network device 200. The data arrangement 300 may include a number of fields such as a content prefix field 310, a next hop field 320, and a metric field 330.

The content prefix field 310 may store at least a portion of a content name or other destination address. The value of the content prefix field 310 may indicate that an entry applies to traffic matching the value. The next hop field 320 may store an identification of a next hop device capable of routing traffic matching the associated prefix toward its destination. In various embodiments, the next hop field 320 may alternatively or additionally store an indication of an output line card and/or port for matching traffic. The metric field 330 may store one or more metrics useful in determining which route is fastest, cheapest, or otherwise preferable for a particular prefix.

As an example, the data arrangement 300 is shown as including a number of entries 340-380. The data arrangement 300 may include numerous additional entries 390. A first entry 340 may indicate that traffic matching the content prefix "/TUX" may be forwarded to next hop "b" and that a metric associated with this route is set to a value of "2." The next entry 350 may also apply to traffic matching the content prefix "/TUX," indicating that next hop "d" may also be capable of forwarding this traffic toward the destination, but at a metric of "3." When generating forwarding information, the processor 214 may select one of these entries 340, 350 to be used in forwarding traffic matching the "/TUX" prefix. In this case, the processor 214 may select the first entry 340 because this entry carries the lower metric value of "2." Thus, the processor 214 may instruct the line cards 222*a-b*, 224*a-b*, 226*a-b* to forward this traffic to next hop b through the forwarding information provided.

The third and fourth entries 360, 370 may similarly specify available routes and costs for traffic matching the prefix "/JDOE." Not all entries may include prefixes of the same length. As illustrated by the fifth entry 380, traffic matching the content prefix "/JDOE/PAPERS" may be forwarded to next hop "d" at a metric cost of "1." While a given message may match both prefixes "/JDOE" and "/JDOE/PAPERS," the network devices described herein may employ "longest prefix matching," thereby routing the message according to the longest matching prefix. In the example of FIG. 3, the message would be forwarded according to the information in the fifth entry 380, if this information were provided as forwarding information to the line cards 222*a-b*, 224*a-b*, 226*a-b*.

Figure 4:
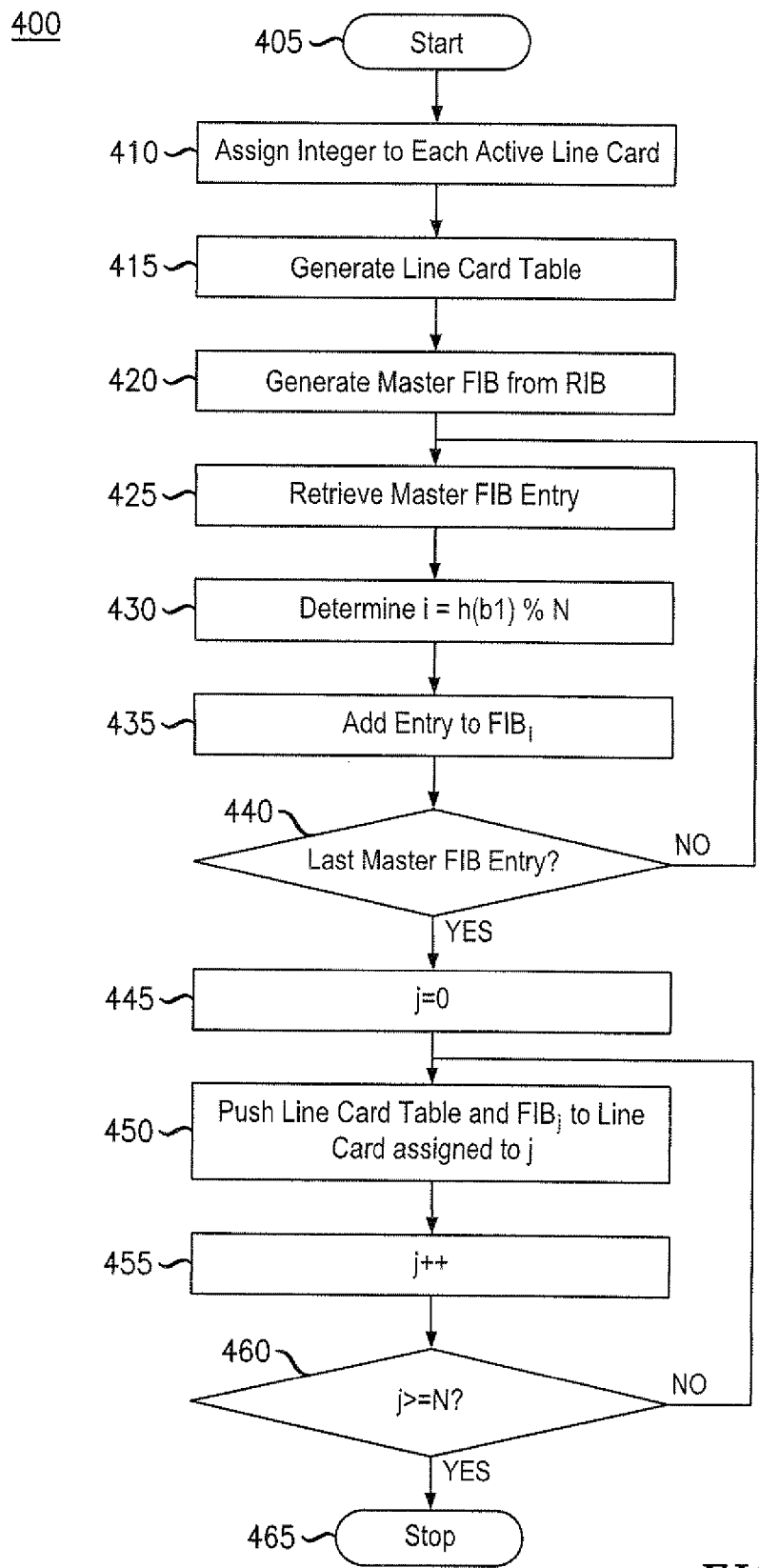
FIG. 4 illustrates an exemplary method for providing distributing forwarding information among line cards.

FIG. 4 illustrates an exemplary method 400 for providing distributing forwarding information among line cards. The method 400 may be performed by the components of the network device 200 such as processor 214. The method 400 may be performed whenever forwarding information should be provided to the line cards 222*a-b*, 224*a-b*, 226*a-b* such as, for example, when the RIB changes or when the number of active line cards changes due to line card failure or other reasons.

The method 400 may begin in step 405 and proceed to step 410 where the processor 214 may assign an integer to each active line card 222*a-b*, 224*a-b*, 226*a-b*. This step may include assigning an integer to all line cards 222*a-b*, 224*a-b*, 226*a-b* in the system, only those line cards that are active 222*a-b*, 224*a-b*, 226*a-b*, or only those line cards 222*a-b*, 224*a-b*, 226*a-b* that have not experienced a failure. Next, in step 415, the processor 214 may generate a line card table based on the assigned integers. The line card table may be, for example, a table that associates an identification of each line card 222*a-b*, 224*a-b*, 226*a-b* with the assigned integer.

In step 420, the processor 214 may generate a master FIB from the RIB according to any method known in the art. This step may include, for example, evaluating metrics associated with various next hops for various address prefixes, consolidation of various address prefixes, or translation of next hop devices into corresponding output line cards or output ports.

Processor 214 may then begin iterating through the master FIB to create FIBs for each line card 222a-b, 224a-b, 226a-b by retrieving a FIB entry in step 425. Next, the processor 214 may determine which line card 222a-b, 224a-b, 226a-b should receive the RIB entry in step 430. In this example, the processor 214 may retrieve the first component "b1" of the content prefix carried by the entry. For example, if the entry is related to prefix "/JDOE/VIDEOS," the processor 214 may retrieve the component "/JDOE." Next, the processor 214 may hash the component using a hash function such as, for example, CRC-64 to produce a hashed value h(b1). The processor may then generate an index "i" by evaluating h(b1) modulo N, where N is the number of active line cards. The resulting index "i" may be used in conjunction with the line card table generated in step 415 to determine the line card to which integer "i" has been assigned. After matching the integer "i" to a line card 222a-b, 224a-b, 226a-b, the processor 214 may, in step 435, add the FIB entry to the FIB to be transmitted for integer i, $FIB_i$. Next, in step 440, the processor 214 may determine whether the master FIB includes additional entries to process. If so, the processor 214 may loop back to step 425. Otherwise, the method 400 may proceed to step 445.

In step 445, the processor 214 may begin iterating through the active line cards by initializing a variable "j" to a value of "0." Next, in step 450, the processor 214 may push the line card table and $FIB_j$ to the line card 222a-b, 224a-b, 226a-b that has been assigned the integer "j" in step 410. Then, the processor 214 may increment the value of "j" in step 455 and determine whether additional active line cards 222a-b, 224a-b, 226a-b remain to be processed, in step 460. If the current value of "j" is not greater than or equal to the number of active line cards n, the processor 214 may loop back to step 450. Otherwise, the method 400 may proceed to end in step 465.

It will be understood that various modifications to the method are possible. For example, instead of generating a master FIB and then splitting the FIB into subsets, the processor may generate the FIB for each line card 222a-b, 224a-b, 226a-b directly or concurrently. Various additional modifications will be apparent.

Figure 5:
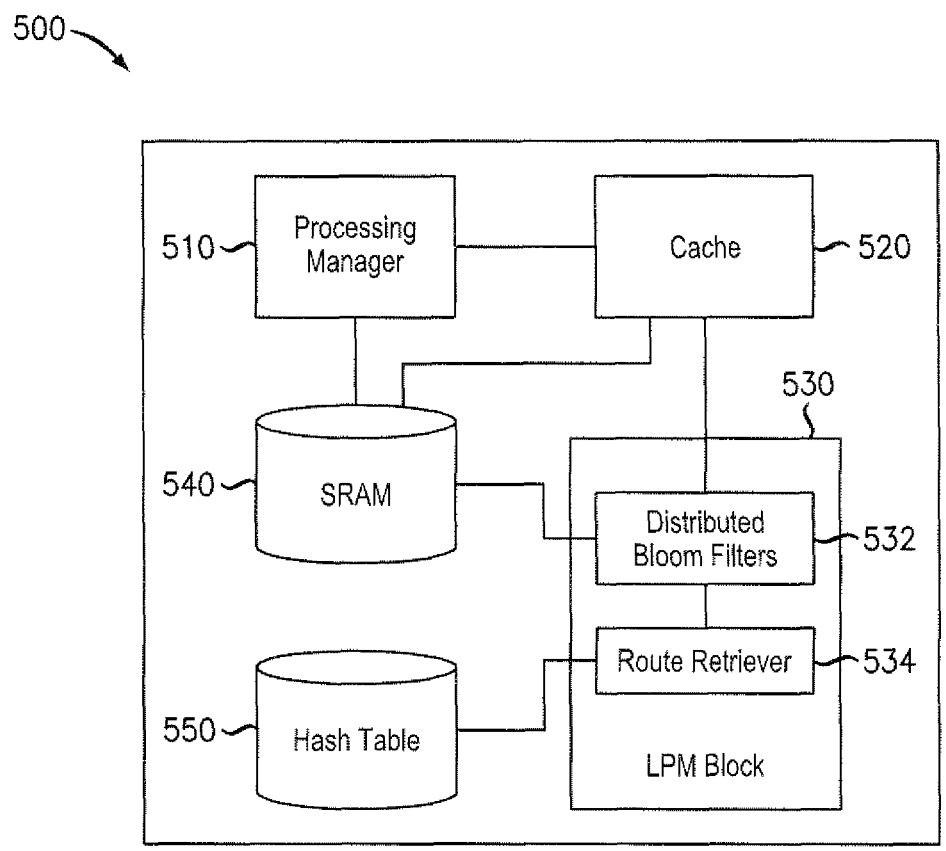
FIG. 5 illustrates an exemplary line card.

FIG. 5 illustrates an exemplary line card 500. The line card 500 may correspond to one or more of the line cards 222a-b, 224a-b, 226a-b of the exemplary network device 200. The line card 500 may include a processing manager 510, a cache 520, a longest prefix matching (LPM) block 530, an SRAM 540, and a hash table storage 550. The LPM block may include a distributed Bloom filters module 532 and a route retriever 534.

The processing manager 510 may include hardware and/or executable instructions on a machine-readable storage medium configured to receive a message to be forwarded and determine whether the line card 500 or some other line card 500 should process the message. As will be explained in greater detail below with respect to FIG. 9, the line card may extract the destination address from the message, perform a mathematical operation on at least a portion of the address, and use a line card table stored in the SRAM 540 to determine which line card includes a FIB configured to process the message. If the processing manager 510 determines that a different line card should process the message, the processing manager 510 may pass the message to that other line card. Otherwise, the processing manager 510 may pass the message to the cache 520 to begin processing the message.

The cache 520 may include hardware and/or executable instructions on a machine-readable storage medium configured to determine whether a cache table stored in the SRAM 540 includes an entry matching the address of the current message. If so, the cache 520 may forward the message to an output line card as identified by the cache entry. If there is no cache hit, the cache 520 may pass the message to the distributed Bloom filters module 532 of the LPM block 530.

The distributed Bloom filters module 532 may include hardware and/or executable instructions on a machine-readable storage medium configured to utilize Bloom filters stored in the SRAM 540 to determine a likely length of a longest prefix match for the current message. The distributed Bloom filters module 532 may, for example, apply the distributed Bloom filter procedure described in "IPv6 Lookups using Distributed and Load Balanced Bloom Filters for 100 Gbps Core Router Line Cards" by Song et al. and published in 2009 by the IEEE, the entirety of which is incorporated for all purposes herein by reference. The distributed Bloom filters module 532 may then pass the message to the route retriever 534 along with an indication of the likely length of the longest prefix match.

The route retriever 534 may search a FIB stored in the hash table storage 550 for a longest prefix match for the message. Based on the length indicated by the distributed Bloom filters module 532, the route retriever 534 may begin searching the FIB by looking for a matching prefix of the indicated length. If the distributed Bloom filters module 532 encountered a false positive, the route retriever 534 may gradually reduce the length of the prefixes being searched until eventually locating an entry having the longest prefix match for the message. The LPM block 530 may then forward the message to an output line card as indicated by the located entry.

The SRAM 540 may include hardware and/or executable instructions on a machine-readable storage medium configured to store various data useful for the line card 500. Exemplary contents of the SRAM 540 will be described in greater detail below with respect to FIG. 6. SRAM may include a plurality of two-port 32-Kbit SRAM blocks. It will be appreciated that various other types of memory may be used such as, for example, DRAM or flash memory.

The hash table storage 550 may include hardware and/or executable instructions on a machine-readable storage medium configured to store a FIB for line card 500. Thus, the hash table storage may include a machine-readable storage medium such as read-only memory (ROM), random-access memory (RAM), magnetic disk storage media, optical storage media, flash-memory devices, and/or similar storage media. Exemplary contents of the hash table storage 550 will be described in greater detail below with respect to FIG. 8.

The hash table storage 550 may constitute an "off-chip memory" that is implemented as a physically separate device from the other components of line card 500. The processing manager 510, the cache 520, the LPM block 530, and the SRAM 540 may be implemented as a single chip such as, for example, a microprocessor, FPGA, or ASIC.

Figure 6:
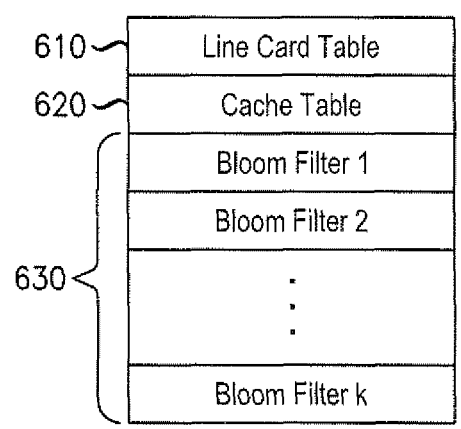
FIG. 6 illustrates exemplary memory contents for a line card.

FIG. 6 illustrates exemplary memory contents 600 for a line card. The exemplary memory contents 600 may describe the contents of the SRAM 540. As illustrated, the memory contents 600 may include a line card table 610, a cache table 620, and a plurality of Bloom filters 630. The line card table 610 may be received from the control plane and may associate each active line card with an assigned integer. The cache table 620 may store a number of cache entries for use in bypassing the longest prefix matching operation. Exemplary contents of the cache table 620 will be described in greater detail below with respect to FIG. 7. The Bloom filters 630 may include a selected number of Bloom filters, "k," to be used in estimating the length of a longest prefix match. The number "k" may be selected, for example, based on a Bloom filter formula for reducing or minimizing a possibility of false positives when evaluating the Bloom filters.

FIG. 7 illustrates an exemplary data arrangement 700 for storing cache data. The data arrangement 700 may be implemented using a variety of data structures such as, for example, objects, arrays, linked lists, trees, and/or hash tables. The data arrangement 700 may be stored in, for example, the SRAM 540 of the exemplary line card 500. The data arrangement 700 may include a number of fields such as a content name field 710 and an output card field 720. The content name field 710 may indicate the destination address to which a cache entry may apply. The output card field 720 may indicate an appropriate output line card or output port for forwarding a packet carrying the applicable destination address. The output card field 720 may directly identify the output line card by a line card identifier or may indirectly identify the output line card by, for example, indicating a next hop device or an output port.

As an example, the exemplary data arrangement 700 is illustrated as storing two cache entries 730, 740. The data arrangement 700 may include numerous additional entries 750. The first cache entry 730 may indicate that messages including the destination address "/JDOE/PAPERS/Paper-A.pdf" should be forwarded via line card "2," which may correspond to output line card 2 240b. The second cache entry 740 may indicate that messages including the destination address "/JDOE/notes.txt" should be forwarded via line card "1," which may correspond to output line card 1 220b.

FIG. 8 illustrates an exemplary data arrangement 800 for storing forwarding information, such as a FIB. The data arrangement 800 may be implemented using a variety of data structures such as, for example, objects, arrays, linked lists, trees, and/or hash tables. The data arrangement 800 may be stored in, for example, the hash table storage 550 of the exemplary line card 500. The data arrangement 800 may include a number of fields such as a bucket field 840, a content prefix field 820, and an output card field 830. The bucket field may indicate a bucket identifier. As will be understood, the term "bucket" may refer to an addressable element of a hash table. Each bucket may include multiple sets of forwarding information. The content prefix field 820 may indicate a content prefix for which forwarding information applies. The content prefix may be stored as a hash value. The output card field 830 may indicate an appropriate output line card or output port for forwarding a packet carrying the applicable destination address. The output card field 830 may directly identify the output line card by a line card identifier or may indirectly identify the output line card by, for example, indicating a next hop device or an output port.

As an example, the exemplary data arrangement 800 is illustrated as storing a number "p" of buckets 840-880. The first bucket 840 may include a single set of forwarding information, storing a hash, such as a CRC-64 hash, of the prefix "/JDOE" and indicating that matching messages should be forwarded via an output card "1." The second bucket 850 may include two sets of routing information. The second bucket may indicate that for the longest prefix match "/TUX," messages should be forwarded via output card "1," while for the longest prefix match "/JDOE/VIDEOS," messages should be forwarded via output card "2." These two sets of forwarding information may occupy the same bucket because a mathematical operation used to determine an appropriate bucket may identify bucket "2" for both prefixes. For example, the hash values of either prefix modulo "p" may yield a value of 2. The meaning of the exemplary data in the remaining buckets 860-880 will be apparent in view of the foregoing description.

Figures 9, 10:
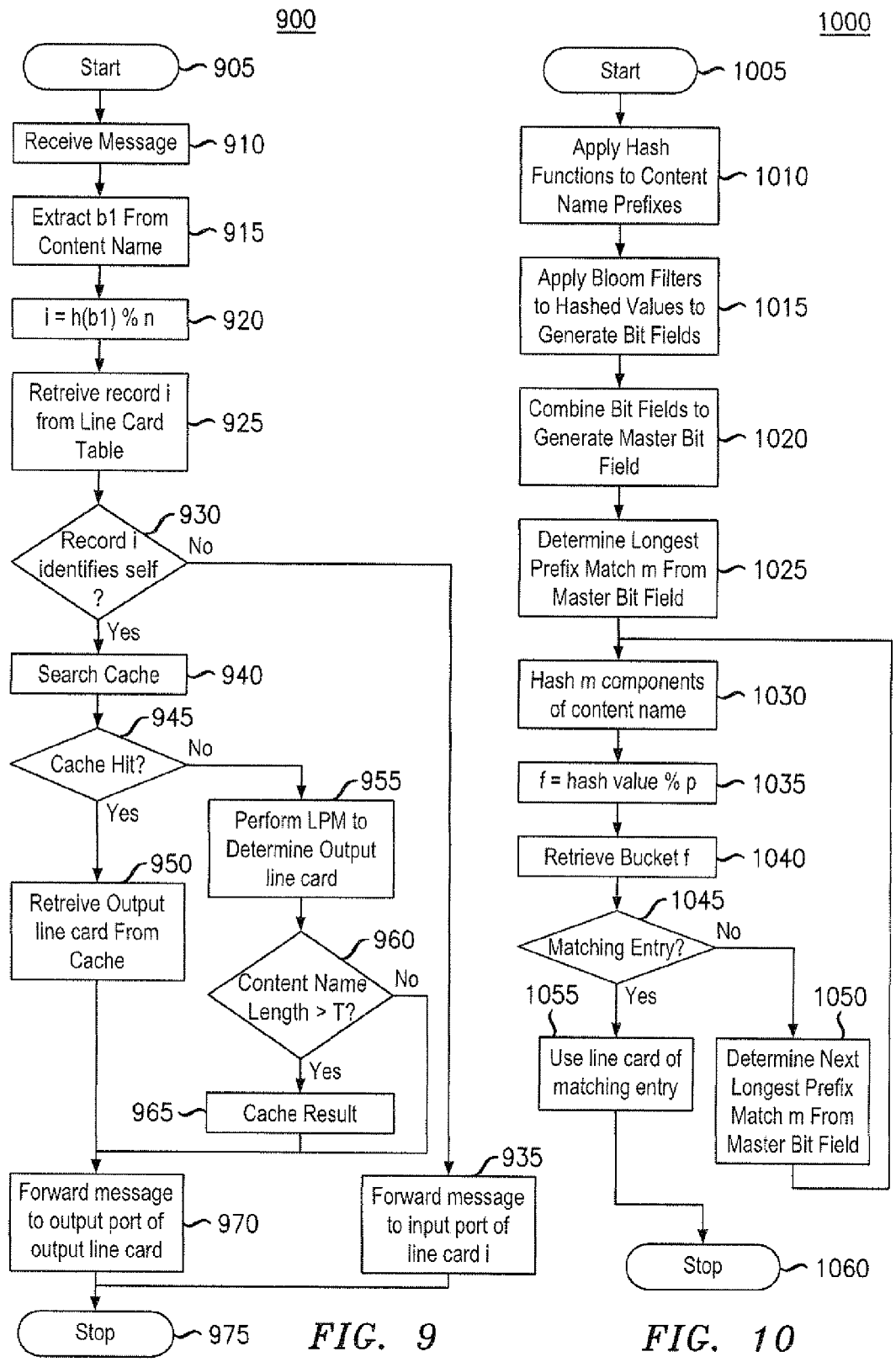
FIG. 9 illustrates an exemplary method for forwarding a message.
FIG. 10 illustrates an exemplary method for performing longest prefix matching.

FIG. 9 illustrates an exemplary method 900 for forwarding a message. The exemplary method may be performed, for example, by the components of line card 500. The method 900 may begin in step 905 and proceed to step 910 where the processing manager 510 may receive a message to be forwarded. The message may be received from another network device or from another line card via a switching fabric. Next, in step 915, the processing manager may extract the first component, "b1," from the content name carried by the message. Then, in step 920, the processing manager may generate a line card index "i" based on b1. This procedure may be similar to the procedure used by the processor 214 in step 430 of the method 400 for distributing forwarding information. The processing manager may hash b1 and calculate the hash modulo n, where n is the number of active line cards. Using this index, the processing manager 510 may retrieve the record "i" from the line card table in step 925 and determine if the record identifies the line card to which the processing manager 510 belongs in step 930. If the record points to a different line card, the processing manager may pass the message to the input port of the identified line card in step 935 and the method 900 may proceed to end in step 975. The identified line card may then execute the method 900 to further process the message.

If, on the other hand, the record identifies the present line card, the method 900 may proceed to step 940 where the cache 520 may search the cache table to determine whether any entry matches the content name of the received message. If there is a cache hit, the cache 520 may determine the appropriate output line card from the cache entry in step 950. Otherwise, the LPM block 530 may perform longest prefix matching using the FIB in step 955 to determine the appropriate output line card. An exemplary LPM procedure will be described in greater detail below with respect to FIG. 10. After identifying an appropriate output line card, the LPM block 530 may determine whether to cache the forwarding information for future use. In various embodiments, the LPM block 530 may cache all located records. In other embodiments, LPM block 530 may cache only those records matching a content name that is over a predetermined length. For example in step 960, the LPM block may determine if the length of the content name carried by the message is greater than a preconfigured threshold "T." If the content name length exceeds "T", the LPM block 530 may, in step 965, cache the content name and identified output card. Finally, in step 970, the line card 500 may forward the message to the output port of the identified line card and the method 900 may proceed to end in step 975.

FIG. 10 illustrates an exemplary method 1000 for performing longest prefix matching. The method 1000 may be performed by the components of LPM block 530. The method 1000 may begin in step 1005 and proceed to step 1010 where the distributed Bloom filters module 532 may apply a number of hash functions, "k" to each possible prefix of the content name. For example, for the content name "/JDOE/VIDEOS/JD2012/vid.avi", the distributed Bloom filters module 532 may hash the prefixes "/JDOE", "/JDOE/VIDEOS", "/JDOE/VIDEOS/JD2012", and "/JDOE/VIDEOS/JD2012/vid.avi" using each of the "k" hash functions.

Next, in step 1015, the distributed Bloom filters module 532 may apply appropriate Bloom filters to each hashed prefix. For example, each hash function applied to the prefixes may be associated with a separate Bloom filter. Each prefix hashed according to the first hash function may be applied to the first Bloom filter, each prefix hashed according to the second hash function may be applied to the second Bloom filter, and so on. The application of each Bloom filter may result in a bit field indicating whether, according to that Bloom filter, each prefix is likely to have a match in the FIB. For example, the bit field "0110" may indicate that the prefixes "/JDOE/VIDEOS" and "/JDOE/VIDEOS/JD2012" are likely to have a FIB match, while the prefixes "IJDOE" and "/JDOE/VIDEOS/JD2012/vid.avi" do not have a match. The distributed Bloom filters module 532 may then, in step 1020, combine each of the "k" bit fields to generate a single master bit field. For example, the distributed Bloom filters module 532 may produce the logical "AND" of all of the "k" bit fields. The master bit field may be used by the distributed Bloom filters module 532 in step 1025 to identify the length "m" of the likely longest prefix match. For example, the position of the first "1" in the master bit field may correspond to the length of the likely longest prefix match.

Next, the route retriever 534 may begin to search for the longest prefix match in the FIB by first, in step 1030, hashing the first "m" components of the content name. Next, the route retriever 534 may determine which bucket to access in step 1035, by calculating a value "f" based on the hash value, or a portion thereof, modulo "p," the total number of buckets. The route retriever 534 may then retrieve bucket "f" from the FIB, in step 1040, and determine whether the bucket includes routing information matching the first "m" components of the content name. If the bucket does not include a match, the route retriever 534 may use the master bit field to determine, in step 1050, the next candidate for the length of the longest matching prefix. The route retriever 534 may then loop back to step 1030. Once the route retriever 534 locates a matching entry in the FIB, the route retriever 534 may determine that the line card indicated by the matching entry should be used to output the message. Method 1000 may then proceed to end in step 1060.

According to the foregoing, it should be apparent that various embodiments enable the efficient use of large routing tables to route messages. For example, by distributing the forwarding information among multiple line cards, the task of next hop lookup may be distributed among such devices, thereby providing an efficient means to support a large routing table. Further, by assigning a subset of destination addresses to each of a plurality of line cards, next hop lookups can be delegated in an efficient and reliable manner.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for forwarding a message, the method comprising:
   receiving, at a first input line card of the network device, a message to be forwarded toward a destination, the message including a destination address;
   determining, by the first input line card, that a second input line card of the network device is configured with routing information related to the destination address;
   transmitting the message, by the first input line card, to the second input line card based on the determination that the second input line card is configured with routing information related to the destination address;
   determining, by the second input line card and based on the routing information related to the destination address, that the message should be forwarded via a first output line card of the network device to another network device;
   transmitting the message, by the second input line card, to the first output line card based on the determination that the message should be forwarded via a first output line card of the network device to another network device; and
   transmitting the message, by the first output line card, to another network device.

2. The method of claim 1, wherein the first output line card comprises one of the first input line card and the second input line card.

3. The method of claim 1, wherein the destination address is a content name.

4. The method of claim 1, wherein the transmitting the message to the second input line card comprises transmitting the message, by the first input line card, to an input port of the second input line card.

5. The method of claim 1, wherein determining, by the first input line card, that the second input line card of the network device is configured with routing information related to the destination address comprises:
   performing a hash function on at least a portion of the destination address to generate a hashed destination address; and
   determining that an assigned identifier of the second input line card corresponds to the hashed destination address.

6. The method of claim 1, wherein the first input line card stores a first set of forwarding information, the second input line card stores a second set of forwarding information that is different from the first set of forwarding information.

7. A network device for forwarding a message, the network device comprising:
   a first input line card that stores a first set of forwarding information; and a second input line card that stores a second set of forwarding information different from the first set of forwarding information,
wherein the first input line card is configured to:
receive a message to be forwarded toward a destination, the message including a destination address,
determine that the second input line card is configured with routing information related to the destination address, and
transfer the message to the second input line card based on the determination that the second input line card is configured with routing information related to the destination address,
wherein the second input line card is configured to
determine, based on the second set of forwarding information, that the message should be forwarded via an output line card,
forward the message to the output line card based on the determination that the message should be forwarded via the output line card, and
wherein the output line card is configured to transmit the message to another network device.

8. The network device of claim 7, wherein the first set of forwarding information and the second set of forwarding information store forwarding information for content address prefixes.

9. The network device of claim 7, wherein the network device comprises a switching fabric and, in forwarding the message based on the second set of forwarding information, the second input line card is configured to transmit the message via the switching fabric.

10. The network device of claim 7, wherein, in determining the second input line card is configured with routing information related to the destination address to: generate a hash value based on at least a portion of the destination address; generate an index based on the hash value and a number of line cards configured for the network device; and determine that the index corresponds to the second input line card.

11. The network device of claim 7, wherein the second set of forwarding information comprises forwarding information for a plurality of address prefixes of differing lengths and, in forwarding the message based on the second set of forwarding information, the second input line card is configured to:
extract a destination address of the message;
apply a set of distributed Bloom filters to the destination address to determine a beginning prefix length; and
begin searching the second set of forwarding information by evaluating forwarding information for at least address prefix having the beginning prefix length.

12. A non-transitory machine-readable storage medium encoded with instructions for execution by a line card in a network device for forwarding messages, the non-transitory machine-readable storage medium comprising:
instructions receiving a message to be forwarded toward a destination, the message including a destination address; instructions for determining that whether the line card or a different input line card of the network device is configured with routing information related to the destination address; instructions for, when the different input line card of the network device is configured with routing information related to the destination address, transmitting the message to the different input line card; instructions for, when the line card is configured with routing information related to the destination address, determining, based on the routing information related to the destination address, that the message should be forwarded via a first output line card of the network device to another network device; instructions for transmitting the message to the first output line card based on the determination that the message should be forwarded via a first output line card of the network device to another network device.

13. The non-transitory machine-readable storage medium of claim 12, wherein the first output line card comprises one of the input line card and the different input line card.

14. The non-transitory machine-readable storage medium of claim 12, wherein the destination address is a content name.

15. The non-transitory machine-readable storage medium of claim 12, wherein the instructions for transmitting the message to the different input line card comprises instructions for transmitting the message to an input port of the different input line card.

16. The non-transitory machine-readable storage medium of claim 12, wherein the instructions for determining whether the line card or the different input line card of the network device is configured with routing information related to the destination address comprises:
instructions for performing a hash function on at least a portion of the destination address to generate a hashed destination address; and
determining that an assigned identifier of the different input line card corresponds to the hashed destination address.

17. The non-transitory machine-readable storage medium of claim 12, wherein the line card stores a first set of forwarding information, the different input line card stores a second set of forwarding information that is different from the first set of forwarding information.

* * * * *